United States Patent Office 3,139,422
Patented June 30, 1964

3,139,422
AZO DYESTUFFS
Gerald Booth, George Trapp Douglas, James Stuart Hunter, and Eric Leslie Johnson, Manchester, England, assignors to Imperial Chemical Industries Limited, Millbank, London, England, a corporation of Great Britain
No Drawing. Original application Oct. 11, 1961, Ser. No. 144,319. Divided and this application Mar. 25, 1963, Ser. No. 267,764
Claims priority, application Great Britain Oct. 4, 1957
1 Claim. (Cl. 260—158)

This application is a divisional application of application Serial No. 144,319, which was filed in the United States on October 11, 1961, and which is a continuation-in-part application of application Serial No. 762,924, filed in the United States on September 24, 1958, now abandoned, and relates to new azo dyestuffs and more particularly to new water-insoluble azo dyestuffs valuable for the colouration of textile materials.

By "water-insoluble azo dyestuffs" is meant, as will be understood by those skilled in the art, dyestuffs which are free from water-solubilising groups. Water-solubilising groups which are typically present in water-soluble azo dyestuffs are sulphonic acid, carboxylic acid and acyl sulphonamido groups. Such water-solubilising groups are not present in the water-insoluble dyestuffs of our invention. It will be recognised, of course, that these water-solubilising groups are all essentially acidic groups, and will form salts if a dyestuff containing the same is placed in an aqueous alkaline medium. Accordingly, it will be understood that the term "water-insoluble azo dyestuff" is used herein in its conventional sense as meaning that there is no such sulphonic acid, carboxylic acid or acyl sulphonamido groups, or salts, of such groups, in the dyestuff molecule.

The new water-insoluble azo dyestuffs of our invention contain sulphonamido groups in which one or both of the hydrogen atoms have been replaced by certain chloroalkyl or bromoalkyl groups. We have found that the new dyestuffs are superior, especially when applied to polyamide textile materials, to the azo dyestuffs already known in that they have good build-up properties and give colourations of exceptionally high fastness to wet treatments. Colourations obtained on textile materials such as polyamide textile materials with disperse dyestuffs are in general deficient in fastness to wet treatments, but the colourations obtained with the new disperse azo dyestuffs of the present invention on textile materials comprising fibres such as wool, silk, regenerated protein fibres, polyamide fibres or basically modified polyacrylonitrile fibres have excellent fastness to wet treatments not only in that they retain their strength of shade but also in that they show very little staining of adjacent textile materials.

The known disperse azo dyestuffs do not react chemically with textile fibres. When however the new azo dyestuffs are applied to textile materials comprising fibres such as wool, silk, regenerated protein, polyamide or basically modified polyacrylonitrile fibres a chemical bond is formed between the dyestuff and the textile fibre. It seems probable that the increased fastness of the new dyestuffs is due at least in part to chemical combination with the fibre in this way. Since the process of dyeing with the new dyestuffs is in reality a chemical reaction between the dyestuff on the one hand, and the textile on the other, it is entirely surprising to find that the new dyestuffs not only have improved fastness properties but that they also give quite level dyeings on textile fibres, particularly polyamide fibres.

The new water-insoluble azo dyestuffs of the invention are of the formula

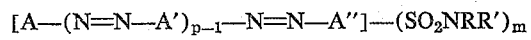

wherein
A is a radical selected from the group consisting of phenyl, naphthyl, thiazolyl and benzthiazolyl radicals,
A' is a radical selected from the group consisting of phenyl and naphthyl radicals,
A'' is a radical selected from the group consisting of phenyl, naphthyl, pyrazolonyl, and acetoacetylaminophenyl radical, said dyestuffs containing at most one group of the formula

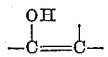

$p$ is selected from 1 and 2;
$m$ is selected from 1 and 2;
R is selected from a class consisting of $\beta$-bromo- and $\beta$-chloro-substituted lower alkyl groups, $\beta:\gamma$-dibromo- and $\beta:\gamma$-dichloro-substituted lower alkyl groups, $\gamma$-bromo- and $\gamma$-chloro-substituted-$\beta$-hydroxy lower alkyl groups, and 2-bromo-cyclohexyl and 2-chlorocyclohexyl; and
R' is selected from the class consisting of hydrogen, lower alkyl, cyclohexyl, allyl, benzyl, monocyclic aryl, chloro lower alkyl, bromo lower alkyl, chlorohydroxy lower akyl, bromohydroxy lower alkyl, chlorocyclohexyl, bromocyclohexyl, hydroxy lower alkyl, ethoxy lower alkyl, and a benzene radical; and
R and R' together form with the nitrogen atom, N, a heterocyclic ring selected from the class consisting of pyrrolidine, alkylpyrrolidine, and piperidine, which heterocyclic ring contains a halogen atom selected from the class consisting of chlorine and bromine;

provided that when $m$ is 2 the two SO$_2$NRR' groups present in the azo dyestuff are attached to different radicals represented by A.

The double bond in the group of the formula

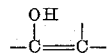

may be an aromatic or aliphatic double bond, and thus the hydroxyl radical in the said group may be a phenolic hydroxyl radical or an enolic hydroxyl radical. When an enolic hydroxyl radical is present the compound may also exist in the ketonic form. Included within the scope of the invention therefore are dyestuffs which contain at most one monohydroxybenzene, monohydroxynaphthalene or monohydroxybenzthiazole radical, or at most one pyrazolonyl or acetoacetylaminophenyl radical.

It will be understood that the term "lower alkyl" used in defining R and R' above indicates an alkyl radical of not more than 4 carbon atoms.

Specifically the $\beta$-bromo and $\beta$-chloro lower alkyl groups represented by R may be for example $\beta$-chloroethyl, $\beta$-bromoethyl, $\beta$-chloropropyl, $\beta$-bromopropyl, $\gamma$ - chloroprop-$\beta$-yl, or $\alpha$-chlorobut-$\beta$-yl groups; the $\gamma$-chloro- and bromo-substituted $\beta$-hydroxy lower alkyl groups may be for example $\gamma$-chloro-$\beta$-hydroxypropyl or $\gamma$-bromo-$\beta$-hydroxypropyl groups; and the $\beta:\gamma$-dichloro substituted lower alkyl groups may be for example $\beta:\gamma$-dichloropropyl, or $\beta:\gamma$-dibromopropyl groups.

Specifically also we may mention the following as examples of the radicals represented by R':

$\beta$-Chloroethyl, $\beta$-bromoethyl, $\beta$-chloropropyl, $\beta$-bromopropyl, $\gamma$-chloro-$\beta$-hydroxypropyl, $\gamma$-bromo-$\beta$ - hydroxypropyl, 2-chlorocyclohexyl, methyl, ethyl, propyl, $\beta$-hydroxyethyl, $\beta$-ethoxyethyl. The term "benzene radical" used in the definition of R' includes not only the phenyl radical, but also substituted phenyl radicals such as tolyl, chlorophenyl, methoxyphenyl and acetylaminophenyl. As examples of heterocyclic rings containing a chlorine or bromine atom, and together formed from the groups R, R' and a nitrogen atom, there may be mentioned chloro and bromo derivatives of pyrrolidine for example 3-chloropyrrolidine and piperidine derivatives such as 3-chloro and 3-bromo piperidine.

The different radicals represented by A in the new water-insoluble azo dyestuffs may carry other substituents in addition to the SO₂NRR' group. As examples of such substituents there may be mentioned alkyl, for example methyl, alkoxy, for example methoxy, halogen, for example chloro or bromo, alkylsulphonyl, for example methylsulphonyl or ethylsulphonyl, cyano, trifluoromethyl, dialkylamino, for example dimethylamino or diethylamino, acylamino, for example acetylamino, and carbalkoxy, for example carbomethoxy.

The dyestuffs of the invention may be manufactured by diazotising an amine of the formula ANH₂ or $$A-(N=N-A')_{p-1}-NH_2$$

wherein A and A' have the meanings stated above, coupling the diazo compound so obtained with a coupling component, the amine and the coupling component being so chosen that the resultant azo dyestuff is water-insoluble as aforesaid and contains at most one radical of the formula

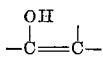

and contains one or two groups of the formula SO₂NRR' where R and R' have the meanings stated above, each of the said groups being attached to a different aryl nucleus present in the azo dyestuff.

Diazotisation of amines of the above formulae may be conveniently brought about by adding sodium nitrite to a solution or suspension of the aromatic or heterocyclic amine in an aqueous solution of an acid for example hydrochloric acid and the diazo solution or suspension obtained may then be added to a solution of the coupling component in a suitable solvent for example water, the pH of the mixture being adjusted to ensure that coupling takes place at a convenient rate. The water-insoluble azo dyestuff which is precipitated may then be filtered off. When the coupling is carried out in the presence of a solvent for the water-insoluble azo dyestuff, for example acetone, the dyestuff is preferably isolated by adding water until all the dyestuff has been precipitated.

As examples of amines of the above formulae there may be mentioned 2-, 3- or 4-aminobenzenesulphon-N-(β-chloroethyl)amide 2-, 3- or 4-aminobenzenesulphon-N-(β-bromoethyl)amide, 2-aminobenzenesulphon-N-(γ-chloroprop-β-yl)amide, 3-chloro-4-aminobenzenesulphon-N-(β-chloroethyl)amide, 2:5-dichloro-4-aminobenzene-sulphon-N-(β-chloroethyl)amide, 2-naphthylamine-6-sulphon-N-(β-chloroethyl)amide, 3- or 4-aminobenzenesulphon-N-(β-chloroethyl)methylamide, 2-, 3- or 4-aminobenzenesulphon-N-(β-chloroethyl)phenylamide, 2-, 3- or 4-aminobenzenesulphon-N-(γ-chloro-β-hydroxypropyl)phenylamide, 2-, 3- or 4-aminobenzenesulphon-N-(2'-chlorocyclohexyl)amide, 2-, 3- or 4-aminobenzenesulphon-N-(3-chloropiperidyl)amide, 2:5-dimethoxy-4-aminoazobenzene-3'-sulphon-N-(β-chloroethyl)amide, aniline, o-, m- or p-toluidine, o, m, or p-chloroaniline, o, m, or p-nitroaniline, 3-chloro - 4 - aminophenylmethylsulphone, o, m, or p-anisidine, 5-nitro-2-amino thiazole, 6-ethoxy-2-aminebenzthiazole, 2-amino-5-nitrobenzenesulphon-N-(β-chloroethyl)amide, 6-methylsulphonyl-2-aminobenzthiazole-m-aminobenzotrifluoride, 4-aminobenzonitrile, 2-carbomethoxyaniline, p-aminoacetanilide, 2:5-dimethoxyaniline, α- or β-naphthylamine, 1-naphthylamine-4- or 5-sulphon-N-(β-chloroethyl)amide, and 4-aminoazobenzene.

Amines of the above formulae which contain an —SO₂NRR' group as hereinbefore defined may be obtained from the corresponding amines which contains a sulphonic acid group by acetylating the amino group, converting the sulphonic acid to the corresponding sulphonchloride, subsequently reacting with an amine of the formula: NHRR' where R and R' have the meanings stated above and finally hydrolysing off the N-acetyl group. Alternatively such amines may be obtained from the corresponding nitro sulphonic acids by converting to the sulphonchlcride, reacting with an amine of the formula: NHRR' where R and R' have the meanings stated above and subsequently reducing the nitro group to an amino group.

As examples of coupling components which may be used in the manufacture of the new water-insoluble azo dyestuffs there may be mentioned phenols, for example phenol, p-cresol and p-phenylphenol, naphthols, for example β-naphthol and 2-naphthol-6-sulphon-N-(β-chloroethyl)amide, arylamines, for example N-ethyl-N-β-hydroxyethylaniline, 3-methyl-N:N-di(β-hydroxyethyl)aniline, 2-methoxy-5-methyl-N:N-di(β-hydroxyethyl)aniline, N-β-hydroxyethyl-1-naphthylamine, 2-naphthylamine-6-sulphon-N-(β-chloroethyl)amine, N-β-cyanoethyl-1-naphthylamine, 3-methyl-N-(β-hydroxyethyl)-N-(β-cyanoethyl)aniline, 3-N:N-diethylaminobenzenesulphon-N-(β-chloroethyl)amide, pyrazolones, for example 3-methyl-5-pyrazolone, 3-carbethoxy-5-pyrazolone, 1-[3'-(β-chloroethyl)aminosulphonylphenyl]3-methyl-5-pyrazolone, and acetoacetylaminobenzene compounds, for example acetoacetanilide and 3-acetoacetylaminobenzenesulphon-N-(β-chloroethyl)amide.

Phenols and naphthols which contain an —SO₂NRR' group, as hereinbefore defined, may be obtained from the corresponding phenol or naphthol sulphonic acids by treating with p-toluenesulphonylchloride, reacting the O-p-toluenesulphonyl derivative so obtained with phosphorus pentachloride, treating the sulphon chloride so obtained with an amine of the formula: HNRR' where R and R' have the meanings stated above, and subsequently hydrolysing off the O-p-toluenesulphonyl group.

Arylamines which contain an —SO₂NRR' group, as hereinbefore defined, may be obtained by converting the corresponding arylamine sulphonic acid to the sulphonchloride and subsequently treating with an amine of the formula: HNRR' where R and R' have the meanings stated above.

Pyrazolones which contain an —SO₂NRR' group, as hereinbefore defined, may be obtained from the corresponding aromatic amines containing the —SO₂NRR' group by diazotising, reducing to the hydrazine, condensing with ethylacetoacetate or acetoacetamide and ring closing.

Acetoacetylaminobenzene compounds which contain an —SO₂NRR' group as hereinbefore defined may be obtained from the corresponding aromatic amine containing the —SO₂NRR' group by reacting the aromatic amine with diketene.

Alternatively the water-insoluble dyestuffs of the invention may be manufactured by converting the corresponding azo compound containing one or more sulphonic acid groups to the sulphonchloride and subsequently treating with an amine of the formula: HNRR' where R and R' have the meanings stated above.

Azo compounds containing one or more sulphonic acid groups used in this alternative process may be obtained, by coupling diazotised primary aromatic or heterocyclic amines with coupling components, the aromatic or heterocyclic amines and coupling components being so chosen that the resultant azo compounds are water-insoluble as aforesaid and contain at most one radical of the formula

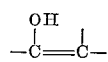

and one or two SO₃H groups each of which is directly attached to a different aryl nucleus.

If desired the water-insoluble azo dyestuffs of the invention may be prepared in situ on the textile material by treating the textile material separately or simultaneously with an aqueous solution or dispersion of a coupling component and with an aqueous solution or dispersion of an aforesaid amine of the formula A—NH₂ or A—(N=N—A')ₚ₋₁—NH₂ in conjunction with a treatment with aqueous nitrous acid, the coupling component and the amine being so chosen that the resultant dyestuff contains one or two groups of the formula —SO₂NRR' as hereinbefore defined, contains at most one radical of the formula

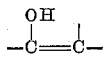

and is water-insoluble as aforesaid.

The new water-insoluble azo dyestuffs as hereinbefore defined may be used for the colouration of textile materials comprising animal fibres such as wool, silk and regenerated protein fibres, and artificial fibres such as cellulose ester fibres for example secondary cellulose acetate and cellulose triacetate fibres, synthetic linear polyamide fibres, especially polyhexamethylene adipamide and polycaprolactam, polyurethane, polyester, polyacrylonitrile and modified polyacrylonitrile fibres, by treating the textile materials with aqueous dispersions of the dyestuffs. The aqueous dispersions of the dyestuffs may be obtained by methods known and described for disperse dyestuffs in general, for example by milling with the aid of dispersing agents for example the sodium salt of sulphonated naphthalene formaldehyde condensation products with or without the addition of protective colloids for example dextrin. The dyestuffs may if desired be converted into a dispersible powder form. Substances known to assist or improve dyeing, for example the dispersing agents and protective colloids described above and electrolytes, may be added to the dyebath.

The dyestuffs may be applied to the textile materials at a temperature at or near the boiling point of the dyebath, preferably at a temperature between 75° C. and 100° C., or if desired, a higher temperature for example a temperature between 100° C. and 130° C. may be used at superatmospheric pressure. Textile materials which are not stable at temperatures above 90° C., for example secondary cellulose acetate, are preferably dyed at temperatures between 60° C. and 85° C.

In the dyeing of cellulose triacetate or polyester textile materials with the dyestuffs of this invention it is sometimes advantageous to use a swelling agent or other "carrier" material for example diphenyl, dichlorobenzene, or trichloroethylene.

The new water-insoluble dyestuffs may also be applied to textile materials in the form of a thickened printing paste containing a fine dispersion of the dyestuff. The printing paste may be thickened with any of the usual thickening agents for example with methyl cellulose, starch, locust bean gum, Nafka crystal gum, or sodium alginate, and may contain normal adjuvants for printing pastes such as urea, thiourea or thiodiglycol, adjuvants for the application of disperse dyes such as methylated spirits, sodium meta-nitrobenzenesulphonate or aqueous emulsions of sulphonated oils, swelling agents or dyeing "carriers" such as diphenyl.

The printing paste may be conveniently applied to the textile materials by printing with block, spray, stencil, screen or roller, preferably drying the printed materials and if desired steaming at superatmospheric pressure, when a temperature above 100° C., preferably between 110° C. and 130° C., is required.

The new water-insoluble azo dyestuffs are of especial value for printing cellulose acetate textile materials.

If desired the water-insoluble azo dyestuffs, as hereinbefore defined, may be applied to artificial textile materials in conjunction with a treatment with an amine, phenol or thiophenol, which may be applied to the textile material prior to, simultaneously with or subsequent to the application of the dyestuff.

When used on textile materials comprising wool, silk or regenerated protein fibres or artificial fibres such as polyamide fibres or basically modified polyacrylonitrile fibres the new water-insoluble azo dyestuffs, as hereinbefore defined, give colourations distinguished by their high fastness to wet treatments and to dry heat. They also have excellent dyeing properties, especially build-up and levelling properties, and on this account they are of great value for application to barré nylon. In many cases also the new water-insoluble dyes have excellent fastness to light.

A preferred class of the new water-insoluble azo dyestuffs, as hereinbefore defined, are those azo dyestuffs in which R represents a β-chloroethyl or a β-bromoethyl radical and R' represents a hydrogen atom, that is to say in which SO₂NRR' is representative of a sulphon-N-(β-chloroethyl)amide or a sulphon-N-(β-bromoethyl)amide group.

As examples of this preferred class of the new water-insoluble azo dyestuff, as hereinbefore defined, there may be mentioned the dyestuffs of the formula

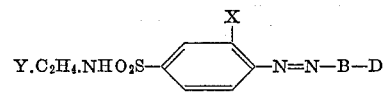

wherein Y is selected from the class consisting of chlorine and bromine, X is selected from the class consisting of hydrogen, chlorine, and bromine, B represents a member selected from the class consisting of a benzene and a naphthalene radical, and D is selected from the class consisting of a primary amino, a secondary amino, and a tertiary amino group.

The benzene or naphthalene radical represented by B may carry substitutents, for example alkyl such as methyl, trifluoromethyl, alkoxy such as methoxy, halogen such as chlorine and bromine, and acidylamino such as acetylamino.

As examples of the primary, secondary and tertiary amino groups which may be represented by D there may be mentioned methylamino, ethylamino, β-hydroxyethylamino, β-cyanoethylamino, dimethylamino, diethylamino, di - (ethoxyethyl)amino, methyl - β - hydroxyethylamino, ethyl-β-hydroxyethylamino, β-cyanoethyl-β-hydroxyethylamino, β-cyanoethyl-β-methoxyethylamino, ethyl-β:γ-dihydroxypropylamino and butyl-β-hydroxyethylamino, and as examples of the halogen atoms represented by X there may be mentioned chlorine and bromine.

When applied to textile materials, the dyestuffs of this formula give orange to violet shades which are non-phototropic and possess excellent fastness to light, to wet treatments and to dry heat. They have excellent dyeing properties on polyamide and cellulose ester textile materials.

As further examples of the preferred class of water-insoluble azo dyestuffs, as hereinbefore defined, there may be mentioned dyestuffs of the formula

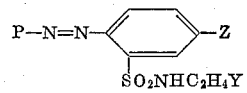

wherein P represents a member selected from the class consisting of a benzene, naphthalene, thiazole, and benzthiazole radical, Y is selected from the class consisting of a chlorine and a bromine atom, and Z represents a tertiary amino group.

As specific examples of the radicals represented by P there may be mentioned p-nitrophenyl, 2-chloro-4-nitrophenyl, p - sulphonamidophenyl, 2 - chloro - 4 - ethylsulphonylphenyl, 4 - cyano - 2 - trifluoromethylphenyl, 2-cyano - 4 - nitrophenyl, 4 - nitro - 2 - trifluoromethylphenyl, 2 - chloro - 4 - β - hydroxyethylsulphonylphenyl, 5 - nitrothiazole - 2 - yl, 6 - nitrobenzthiazole - 2 - yl, 6-methylsulphonyl - benzthiazole - 2 - yl, and 6 - sulphamyl-2-naphthyl.

As examples of tertiary amino groups represented by Z we may mention dimethylamino, diethylamino, dibutylamino, di - (β - hydroxyethyl)amino, N - ethyl - N - β-hydroxyethylamino, N:N - di - (β - cyanoethyl)amino, N - β - hydroxyethyl - N - β' - cyanoethylamino, N:N-di - (β - methoxyethyl)amino and B - methoxyethyl - N-β'-cyanoethylamino.

When applied to artificial textile materials comprising polyamide fibres, the dyestuffs of the above formula give orange to blue shades possessing excellent fastness to wet treatments and to dry heat. They also have excellent dyeing properties.

As further examples of the preferred class of the new water-insoluble azo dyestuffs, as hereinbefore defined, there may be mentioned the azo dyestuffs of the formula

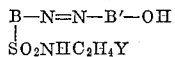

wherein B and B' each represent a benzene radical, Y is selected from the class consisting of a chlorine and a bromine atom, and the —OH group is attached to B' ortho to the —N=N— link.

The benzene radicals B and B' may carry substituents for example halogen such as chloro and bromine, alkyl such as methyl and tert-butyl, alkoxy such as methoxy, and aryl such as phenyl.

When applied to artificial textile materials the dyestuffs of the above formula give yellow shades which are non-phototropic and which have excellent fastness to wet treatments, to light and to dry heat. They also have excellent dyeing properties on polyamide and cellulose acetate textile materials.

As further examples of the preferred class of the new water-insoluble azo dyestuffs, as hereinbefore defined, there may be mentioned the dyestuffs of the formula

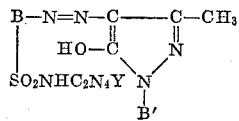

wherein B and B' each represent a benzene radical and Y is selected from the class consisting of a chlorine and a bromine atom.

The benzene rings B and B' may carry substituents for example halogen such as chlorine or bromine, alkyl such as methyl, alkoxy such as methoxy, trifluoromethyl, sulphonamido or substituted sulphonamido such as sulphon-(β-hydroxyethyl)amido, and acidylamino such as acetylamino but it is preferred that the benzene ring is substituted by an alkyl group or a halogen atom in the 2' position.

When applied to artificial textile materials the dyestuffs of the above formula give greenish yellow shades possessing excellent fastness to wet treatments and to light.

The invention is illustrated but not limited by the following examples in which the parts and percentages are by weight.

*Example 1*

A solution of 6.9 parts of sodium nitrite in 50 parts of water is added gradually to a solution of 27.1 parts of 4-aminobenzenesulphon-N-(β-chloroethyl)amide hydrochloride in a mixture of 400 parts of water and 15 parts of a 36% aqueous solution of hydrochloric acid at a temperature between 15° C. and 20° C. The solution so obtained is added during 20 minutes to a solution of 16.5 parts of N-ethyl-N-beta-hydroxyethylaniline in a mixture of 200 parts of water and 11.2 parts of a 36% aqueous solution of hydrochloric acid at a temperature between 0° C. and 5° C. After stirring the mixture for 2 hours it is neutralised to Congo red by adding 55 parts of a 30% aqueous solution of sodium acetate slowly over 30 minutes. After 5 minutes the insoluble 4-(β-chloroethyl) aminosulphonyl-4'-N-ethyl-N-(β-hydroxyethyl) - aminoazo-benzene is filtered off, washed with water and dried.

1 part of the product so obtained is dispersed in 20 parts of water by milling in the presence of a sodium salt of a sulphonated naphthalene formaldehyde condensation product and the dispersion so obtained is added to 4,000 parts of water containing 4 parts of a condensate of ethylene oxide with a fatty alcohol. 100 parts of nylon (polyamide) textile material are placed in the dyebath so obtained and the dyebath is then heated to 95° C. and maintained at that temperature for 60 minutes. The nylon fabric is then rinsed in water, immersed for 30 minutes in a hot aqueous solution containing 0.2% of sodium carbonate and 0.1% of a condensate of ethylene oxide with an alkyl phenol, again rinsed with water and dried. The polyamide textile material is dyed to an orange shade of very good fastness to washing.

Polyhexamethylene adipamide or polycaprolactam may be used as the nylon (polyamide) textile material in this example and throughout the following examples.

If the polyamide textile material is replaced by 100 parts of secondary cellulose acetate and the dyebath is heated at 85° C. for 60 minutes the cellulose acetate is dyed to an orange shade.

*Example 2*

The 16.5 parts of N-ethyl-N-β-hydroxyethylaniline used in Example 1 is replaced by 19.5 parts of N:N-di-(β-hydroxyethyl) - m-toluidine. 4-(β-chloroethyl)aminosulphonyl-2'-methyl-4'-N:N-di(β-hydroxyethyl) - aminoazo benzene is obtained which dyes secondary cellulose acetate in orange shades and polyamide textile materials in orange shades of very good fastness to washing.

The degree of fixation of the dyestuff on the dyed nylon is determined as follows:

The dyed polyamide textile material is successively extracted with n-propanol at 85° C. until no more dyestuff is removed from the nylon on further treatment with n-propanol. The quantity of dyestuff remaining in the polyamide textile material is then found by dissolving the polyamide textile material in o-chlorophenol and determining the dyestuff colorimetrically. Comparison with the quantity of dyestuff found in the same way to be present in an identical weight of similarly dyed polyamide textile material before extraction with n-propanol gives the degree of fixation as 69%.

In a similar test on polyamide textile material dyed with 4-(beta-hydroxyethyl)-aminosulphonyl-2'-methyl-4'-N:N-di(beta-hydroxyethyl)aminoazobenzene the whole of the dyestuff was extracted by the n-propanol at 85° C.

The following table contains further examples of dyestuffs prepared by interacting diazotised 4-aminobenzene sulphon-N-(beta-chloroethyl)amide with arylamine coupling components according to the method of Example 1.

| Example | Coupling Component | Shade on Polyamide Textile Materials |
|---|---|---|
| 3 | N:N-di-(2'-hydroxyethyl)amino-2-methoxy-5-methylbenzene. | Reddish-orange. |
| 4 | N-2-hydroxyethyl-N-2'-aminoethylaniline. | Reddish-yellow. |
| 5 | N-2-hydroxyethyl-N-2'-cyanoethyl-m-toluidine. | Yellowish-orange. |
| 6 | N-2-hydroxyethyl-alpha-naphthylamine. | Red. |
| 7 | N-beta-hydroxyethyl-2-naphthylamine. | Bright red. |
| 8 | N:N-di(beta-hydroxyethyl)aniline. | Orange. |
| 9 | N-beta-hydroxyethyl-N-beta-cyanoethyl aniline. | Reddish-yellow. |
| 10 | 3-N:Ndiethylaminobenzenesulphon-N-(beta-chloroethyl)amide. | Orange. |
| 11 | 2-naphthylamine-6-sulphonamide. | Do. |
| 12 | 2-naphthylamine-6-sulphon-N-(beta-chloroethyl)amide. | Do. |
| 13 | 3-hydroxy-1:2:3:4-tetrahydro-7:8-1':2'-benzoquinoline. | Rubine. |
| 14 | 2-N:N-di(beta-hydroxyethyl)amino 4-acetylaminoanisole. | Red. |
| 15 | 1-N-beta-hydroxyethylamino-5:8-dichloronaphthalene. | Do. |
| 16 | 1-N-beta-hydroxyethylamino-4-chloronaphthalene. | Pink. |
| 17 | 2-ethoxy-1-naphthylamine. | Bluish-red. |
| 18 | 5:6:7:8-tetrahydro-1-N:N-di-(beta-hydroxyethyl)naphthylamine. | Orange. |

The fixation on the polyamide textile material was 74% in the case of Example 5 and 70% in the case of Example 6.

Example 19

30.55 parts of 3-chloro-4-aminobenzenesulphon-N-beta-chloroethylamide hydrochloride are dissolved by warming in a mixture of 200 parts of acetic acid and 15 parts of a 36% aqueous solution of hydrochloric acid and the solution cooled to a temperature between 15° C. and 20° C. To the suspension so obtained is added over 10 minutes a solution of 6.9 parts of sodium nitride in 50 parts of water. 200 parts of water are then added and the resulting suspension of diazonium compound is added over 20 minutes to a solution of 19.5 parts of N:N-di(beta-hydroxyethyl)-m-toluidine in a mixture of 180 parts of water and 18 parts of a 36% aqueous solution of hydrochloric acid at a temperature between 0° C. and 5° C. The mixture is stirred for 30 minutes, neutralised to Congo red by slowly adding 70 parts of a 30% aqueous solution of sodium acetate and then stirred for a further 5 minutes. 2 - chloro - 4 - (beta - chloroethyl)aminosulphonyl-2'-methyl - 4'-N:N - di(beta-hydroxyethyl)aminoazobenzene so obtained is then filtered off, washed with water and dried. When dispersed in aqueous medium it dyes secondary cellulose acetate to reddish-orange shades and polyamide textile materials to scarlet shades of very good fastness to washing.

The fixation of the dyestuff on the dyed nylon is 69%.

Example 20

A solution of 6.9 parts of sodium nitrite in 50 parts of water is added gradually to a solution at 10° C. of 27.1 parts of 3-aminobenzenesulphon - N - (beta - chloroethyl)amide hydrochloride in a mixture of 480 parts of water and 15 parts of a 36% aqueous solution of hydrochloric acid. The solution so obtained is added during 10 minutes to a solution of 10.9 parts of p-cresol and 10.8 parts of sodium carbonate in a mixture of 240 parts of water and 8 parts of a 32% aqueous solution of sodium hydroxide solution at 0° C. The 3-(beta-chloroethyl)-aminosulphonyl - 2'-hydroxy - 5'-methylazobenzene is filtered off, washed with water and dried. When dispersed in aqueous medium it dyes polyamide textile materials in yellow shades of good fastness to washing.

The following table gives the shades on polyamide textile materials of the dyestuffs obtained by similarly coupling diazotised 4-aminobenzenesulphon-N-(beta-chloroethyl)amide with the coupling components specified in the second column of the table.

| Example | Coupling Component | Shade on Polyamide Textile Materials |
|---|---|---|
| 21 | m-methoxyphenol | Reddish-yellow. |
| 22 | p-methoxyphenol | Orange. |
| 23 | 3-methyl-5-pyrazolone | Do. |
| 24 | 3-carbethoxy-5-pyrazolone | Do. |
| 25 | 1-phenyl-3-methyl-5-pyrazolone | Do. |
| 26 | 1-(2'-chlorophenyl)-3-methyl-5-pyrazolone | Do. |
| 27 | 1-(2'-tolyl)-3-methyl-5-pyrazolone | Do. |
| 28 | 1-(m-trifluoromethylphenyl)-3-methyl-5-pyrazolone. | Do. |
| 29 | 1-[3'-(N-methyl-N-beta-hydroxyethyl sulphonamido)phenyl]-3-methyl-5-pyrazolone. | Do. |
| 30 | 1-(6'chloro-2'-tolyl)-3-methyl-5-pyrazolone | Reddish-yellow. |
| 31 | Acetoacet-m-4-xylidide | Greenish-yellow. |

Example 32

The 10.9 parts of p-cresol used in Example 20 are replaced by 16.1 parts of 2:4-dihydroxyquinoline. A dyestuff is obtained which dyes polyamide textile materials in greenish-yellow shades of good fastness to washing.

Example 33

27.1 parts of 3-aminobenzenesulphon - N-(beta-chloroethyl)amide hydrochloride are diazotised as in Example 20 and the resulting solution is added during 10 minutes to a solution of 15.3 parts of 2:5-dimethoxyaniline in a mixture of 200 parts of water and 10 parts of a 36% aqueous solution of hydrochloric acid at a temperature of between 0° C. and 5° C. After 12 hours the insoluble product is filtered off and then stirred into a mixture of 1200 parts of water and 25 parts of a 36% aqueous solution of hydrochloric acid. A solution of 6.9 parts of sodium nitrite in 50 parts of water is then added at 10° C. and the mixture stirred for 4 hours. The mixture so obtained is added to a solution of 9.4 parts of phenol and 16.0 parts of sodium carbonate in a mixture of 400 parts of water and 8 parts of a 32% aqueous solution of sodium hydroxide solution at a temperature between 0° C. and 5° C. The diazo compound so obtained is filtered off, washed with water and dried. When dispersed in aqueous medium it dyes polyamide textile materials in orange shades of good fastness to washing.

Example 34

27.1 parts of 3-aminobenzenesulphon-N-(beta-chloroethyl)amide hydrochloride are diazotised according to the method of Example 20 and the resulting solution is added during 10 minutes to a solution of 18.1 parts of N:N-di(beta-hydroxyethyl)aniline in a mixture of 200 parts of water and 10 parts of a 36% aqueous solution of hydrochloric acid at a temperature of between 0° C. and 5° C. The mixture is neutralised to Congo red by the addition of 50 parts of a 30% aqueous solution of sodium acetate and after 12 hours the resulting dye is filtered off, washed with water and dried. When dispersed in aqueous medium it dyes polyamide textile materials in orange shades of good fastness to washing.

Example 35

The 18.1 parts of N:N - di(beta - hydroxyethyl)aniline used in Example 34 are replaced by 19.5 parts of N:N-di(beta-hydroxyethyl)-m-toluidine. 3-(beta-chloroethyl)-aminosulphonyl-2'-methyl-4'-N:N-di(beta-hydroxyethyl)-aminoazobenzene is obtained which dyes polyamide textile materials in orange shades of good fastness to washing.

Example 36

27.1 parts of 4-aminobenzenesulphon-N-(beta-chloroethyl)amide hydrochloride are diazotised according to the method of Example 1 and the resulting solution is added during 20 minutes to a solution of 19.9 parts of N-beta-cyanoethyl-alpha-naphthylamine in 800 parts of acetone at a temperature between 0° C. and 5° C. The mixture is stirred for 90 minutes and then neutralised to Congo red by slowly adding 25 parts of a 30% aqueous solution of sodium acetate. The dyestuff is filtered off, washed with water and dried. When dispersed in aqueous medium it dyes cellulose acetate rayon in orange shades and polyamide textile materials in scarlet shades of very good fastness to washing. The fixation of the dyestuff on the dyed polyamide textile material is 68%.

Example 37

A solution of 6.9 parts of sodium nitrite in 50 parts of water is added to a solution of 27.1 parts of 2-aminobenzenesulphon - N - (beta-chloroethyl)amide hydrochloride in a mixture of 130 parts of acetic acid and 4 parts of a 36% aqueous solution of hydrochloric acid at a temperature between 10° C. and 15° C. The solution is stirred for 15 minutes and then added during 20 minutes to a solution of 19.5 parts of N:N-di(beta-hydroxyethyl)-m-toluidine in a mixture of 200 parts of water and 12 parts of a 36% aqueous solution of hydrochloric acid at a temperature of between 0° and 5° C. The mixture is stirred for 2 hours and then neutralised to Congo red by slowly adding 40 parts of a 30% aqueous solution of sodium acetate. The dyestuff is filtered off, washed and dried. When dispersed in aqueous medium it dyes polyamide textile materials in orange shades of excellent fastness to washing and wool in orange shades of good fastness to washing and milling.

*Example 38*

The 27.1 parts of 2 - aminobenzenesulphon - N - (beta-chloroethyl)amide hydrochloride used in Example 14 are replaced by 28.5 parts of 2-aminobenzenesulphon-N-(gamma-chloroprop-2'-yl)amide hydrochloride. A dyestuff is obtained which dyes polyamide textile materials in orange shades of very good fastness to washing, and wool in orange shades of good fastness to washing and milling.

*Example 39*

A solution of 6.9 parts of sodium nitrite in 50 parts of water is added during 5 minutes to a solution of 30.1 parts of 4 - aminobenzenesulphon-N-(gamma-chloro-beta-hydroxypropyl)amide hydrochloride in a mixture of 375 parts of water and 15 parts of a 36% aqueous solution of hydrochloric acid at a temperature of between 5° and 10° C. The solution so obtained is added during 20 minutes to a solution of 19.5 parts of N:N-di(beta-hydroxyethyl)-m-toluidine in 250 parts of water and 15 parts of a 36% aqueous solution of hydrochloric acid at a temperature of between 0° and 5° C. After stirring the mixture for 2 hours it is neutralised to Congo red by adding 62.5 parts of a 30% aqueous solution of sodium acetate slowly over 30 minutes. The insoluble product is filtered off, stirred for 30 minutes in 400 parts of water which have been made alkaline to litmus by the addition of sodium carbonate, filtered off, washed with water and dried. 4-(gamma-chloro - beta - hydroxypropyl)aminosulphon - 2' - methyl-4'-N:N-di(beta-hydroxyethyl)aminoazobenzene is obtained which has very good build-up properties on polyamide textile materials giving orange shades of good fastness to washing.

*Example 40*

30.1 parts of 4-aminobenzenesulphon-N-(gamma-chloro-beta-hydroxypropyl)amide hydrochloride are diazotised as in Example 39 and the solution so obtained is added over 20 minutes to a solution of 10.8 parts of p-cresol in a mixture of 300 parts of water, 50 parts of a 2 N aqueous solution of sodium hydroxide and 75 parts of a 2 N aqueous solution of sodium carbonate at a temperature of between 5° C. and 10° C. The mixture is stirred for 1 hour and the insoluble product filtered off, washed with water and dried. 4-(gamma-chloro-beta-hydroxypropyl)aminosulphon - 2' - hydroxy-5'-methylazobenzene is obtained which dyes polyamide textile materials in yellow shades of good fastness to washing.

*Example 41*

A solution of 6.9 parts of sodium nitrite in 50 parts of water is added gradually to a suspension of 26.9 parts of 4-amino - 3 - chlorobenzene sulphon-N-(beta-chloroethyl) amide in a mixture of 400 parts of water and 25 parts of a 36% aqueous solution of hydrochloric acid at a temperature between 5° C. and 10° C. The suspension so obtained is then added during 20 minutes to a solution of 19.6 parts of N-beta-cyanoethyl-alpha-naphthylamine in a mixture of 512 parts of acetone and 12 parts of a 36% aqueous solution of hydrochloric acid at a temperature of between 0° C. and 5° C. The mixture is stirred for 2¼ hours, 68 parts of a 30% aqueous solution of sodium acetate are added, the mixture then stirred for a further 16 hours, 6 parts of the sodium acetate solution added. The precipitated dyestuff is then filtered off, washed with water and dried. When dispersed in aqueous medium it dyes polyamide textile materials in red shades possessing excellent fastness to washing.

The following table gaves the shade on polyamide textile materials of the dyestuffs obtained by similarly coupling diazotised 4-amino-3-chlorobenzenesulphon-N-(beta-chloroethyl)amide with the coupling components specified in the second column of the table.

| Example | Coupling Component | Shade on Polyamide Textile Materials |
|---|---|---|
| 42 | N:N-di(beta-hydroxyethyl)cresidine | Red. |
| 43 | N-beta-hydroxyethyl-N-beta-cyanoethyl aniline. | Orange. |
| 44 | N-n-butyl-N-beta-hydroxyethyl-m-toluidine | Scarlet. |
| 45 | N-beta-hydroxyethyl-alpha-naphthylamine | Maroon. |
| 46 | N-beta-hydroxyethyl-N-beta-cyanoethyl-m-toluidine. | Reddish-orange. |
| 47 | 3-N:N-dimethylaminobenzenesulphon N-(beta-chloroethyl)amide. | Reddish-orange. |
| 48 | N-beta-hydroxyethyl-2-naphthylamine | Red. |
| 49 | N:N-di(beta-hydroxyethyl)aniline | Reddish-orange. |
| 50 | 2-N:N-di(beta-hydroxyethyl)amino-4-acetylaminoanisole. | Bluish-red. |
| 51 | 2-ethoxy-1-naphthylamine | Reddish-violet. |
| 52 | 4-chloro-1-N-(beta-hydroxyethyl)-naphthylamine. | Bluish-red. |
| 53 | 5:6:7:8-tetrahydro-1-N:N-di(beta-hydroxyethyl)naphthylamine. | Orange. |
| 54 | N-beta-ethoxyethyl-N-beta-cyanoethyl-m-toluidine. | Do. |

The following table gives the shade on polyamide textile materials of other dyestuffs which are obtained by diazotising the amines listed in the second column of the table and coupling the diazo compounds so obtained with the coupling components listed in the third column of the table. The diazotisation of the amines and the subsequent coupling with the coupling components were carried out by the methods described in the previous examples.

| Example | Amine | Coupling Component | Shade on Polyamide Textile Materials |
|---|---|---|---|
| 55 | 2-aminobenzenesulphon-N-(beta-chloroethyl)amide. | 3-methyl-5-pyrazolone | Yellow. |
| 56 | 2-anisidine-4-sulphon-N-(gamma-chloro-beta-hydroxypropyl)amide. | N:N-di(beta-hydroxyethyl)-m-toluidine. | Orange. |
| 57 | 2-anisidine-4-sulphon-N-(beta-chloroethyl)amide. | N-beta-hydroxyethyl-1-naphthylamine. | Red. |
| 58 | 3-aminobenzenesulphon-N-(gamma-chloro-beta-hydroxypropyl)amide. | p-Cresol | Greenish-yellow. |
| 59 | 3-aminobenzensulphon-N-(gamma-chloro-beta-hydroxypropyl)-N-methylamide. | 3-hydroxy-7:8-benz-1:2:3:4-tetrahydroquinoline. | Red. |
| 60 | 3-aminobenzenesulphon-N-(gamma-chloro-beta-hydroxypropyl)anilide. | p-Cresol | Yellow. |
| 61 | 3-aminobenzenesulphon-N-(2'-chlorocyclohexyl)amide. | do | Do. |
| 62 | 4-aminobenzenesulphon-N-(beta:gamma-di-chloropropyl)amide. | N:N-di(beta-hydroxyethyl)-m-toluidine. | Orange. |
| 63 | 2-amino-4-trifluoromethylbenzenesulphon-N-(beta-chloroethyl)amide. | do | Scarlet. |
| 64 | 2-amino-5-nitrobenzenesulphon-N-(beta-chloroethyl)amide. | do | Reddish-violet. |
| 65 | 4-aminobenzenesulphon-N-(gamma-bromo-beta-hydroxypropyl)amide. | do | Orange. |
| 66 | 4-aminobenzenesulphon-N-(beta-bromoethyl)amide. | do | Do. |
| 67 | p-Nitroaniline | 2-naphthol-6-sulphon-N-(beta-chloroethyl)amide. | Reddish-orange. |
| 68 | do | 2-naphthol-6-sulphon-N-(gamma-chloro-beta-hydroxypropyl)amide. | Do. |

| Example | Amine | Coupling Component | Shade on Polyamide Textile Materials |
|---|---|---|---|
| 69 | p-Aminobenzenesulphonamide. | 2-naphthylamine-6-sulphon-N-(beta-chloroethyl)amide. | Orange. |
| 70 | p-Nitroaniline | 3-N:N-diethylaminobenzenesulphon-N-(beta-chloroethyl)amide. | Red. |
| 71 | 2-chloro-4-nitroaniline | ------do------ | Bluish-red. |
| 72 | p-Aminobenzenesulphonamide. | ------do------ | Orange. |
| 73 | 3-chloro-4-aminophenylethyl sulphone. | ------do------ | Scarlet. |
| 74 | 2-amino-5-cyanobenzotrifluoride. | ------do------ | Red. |
| 75 | 2-amino-5-nitrobenzonitrile. | ------do------ | Reddish-violet. |
| 76 | 2-amino-5-nitrobenzotrifluoride. | ------do------ | Bluish-red. |
| 77 | 3-chloro-4-aminophenyl-beta-hydroxyethylsulphone. | ------do------ | Scarlet. |
| 78 | 2-amino-5-nitrothiazole | ------do------ | Blue. |
| 79 | 4-amino-3-nitrotoluene | 3-acetoacetylaminobenzenesulphon-N-(beta-chloroethyl)amide. | Yellow. |
| 80 | 3-aminobenzenesulphon-N-(beta-bromoethyl)methylamide. | p-Cresol | Do. |
| 81 | 2-naphthylamine-6-sulphon-N-(beta-chloroethyl)amide. | N:N-di-(beta-hydroxyethyl)-m-toluidine. | Orange. |
| 82 | 2-aminobenzenesulphon-N-(beta-chloroethyl)amide. | N-beta-hydroxyethyl-1-naphthylamine. | Red. |
| 83 | 2-anisidine-4-sulphon-N-(beta-chloroethyl)amide. | p-Cresol | Yellow. |
| 84 | ------do------ | Methyl-2-hydroxy-3-naphthoate. | Red. |
| 85 | 4-aminobenzenesulphon-N-(beta-gamma-dichloropropyl)amide. | p-Cresol | Yellow. |
| 86 | 2-amino-4-trifluoromethyl benzenesulphon-N-(beta-chloroethyl)amide. | N-beta-hydroxyethyl-1-naphthylamine. | Bluish-red. |
| 87 | 4-aminobenzenesulphon-N-(beta-bromoethyl)amide. | p-Cresol | Yellow. |
| 88 | 4-aminobenzenesulphon-N-(beta-chloroethyl)amide. | ------do------ | Do. |
| 89 | p-Aminobenzenesulphonamide. | 2-naphthol-6-sulphon-N-(beta-chloroethyl)amide. | Orange. |
| 90 | 4-chloro-2-trifluoromethyl aniline. | 2-naphthylamine-6-sulphon-N-(beta-chloroethyl)amide. | Do. |
| 91 | 2-naphthylamino-6-sulphon-N-(β-chloroethyl)amide. | N-β-hydroxyethyl-α-naphthylamine. | Red. |
| 92 | 1-naphthylamine-4-sulphon-N-(β-chloroethyl)amide. | ------do------ | Bordeaux. |
| 93 | 2-amino-6-methylsulphonylbenzthiazole. | N-ethyl-N-(3'-β-chloroethylaminosulphonylbenzyl)aniline. | Bluish red. |
| 94 | ------do------ | 3-N:N-diethylaminobenzenesulphon-N-β-chloroethylamide. | Rubine. |
| 95 | 2-amino-6-(β-chloroethylsulphamyl)benzthiazole. | N-β-hydroxyethyl-N-β'-aminocarbonylethyl-m-toluidine. | Bluish red. |
| 96 | ------do------ | N:N-bis(β-acetoxyethyl)aniline. | Red. |
| 97 | Benzidine | 2-naphthylamine-6-sulphon-β-chloroethylamide (2 moles). | Do. |
| 98 | Aminoazobenzene | 2-naphthol-6-sulphon-(γ-chloro-β-hydroxypropyl)amide. | Scarlet. |
| 99 | 3-aminobenzenesulphon-N-(γ-chloro-β-hydroxypropyl)-N-cyclohexylamide. | p-Cresol | Yellow. |
| 100 | 3-aminobenzenesulphon-N-(γ-chloro-β-hydroxypropyl)-N-benzylamide. | N:N-di-β-hydroxyethyl-m-toluidine. | Orange. |
| 101 | 3-aminobenzenesulphon-N-(γ-chloro-β-hydroxypropyl)-N-allylamide. | N-β-hydroxyethyl-α-naphthylamine. | Red. |
| 102 | 3-aminobenzenesulphon-N-(2'-bromocyclohexyl)amide. | N:N-di-(β-hydroxyethyl)-m-toluidine. | Orange. |
| 103 | 3-aminobenzenesulphon-N-β-chloro-n-butylamide. | p-Cresol | Yellow. |
| 104 | 4-aminobenzenesulphon-N-β-γ-dibromopropylamide. | N:N-di(β-hydroxyethyl)-m-toluidine. | Orange. |
| 105 | 4-aminobenzenesulphon-3'-chloropiperidide. | p-Cresol | Yellow. |
| 106 | Sulphanilamide | 1-[3'-(β-chloroethylaminosulphonylphenyl]-3-methyl-5-pyrazolone. | Do. |
| 107 | 2-amino-4-methylthiazole. | 3-N:N-diethylaminobenzenesulphon-N-β-chloroethylamide. | Orange. |
| 108 | 2-amino-5-methylsulphonylthiazole. | 1-naphthylamine-4-sulphon-N-β-chloroethylamide. | Do. |

The 2-anisidine-4-sulphon-N-(β-chloroethyl)amide used in the above examples may be obtained by treating acetyl-2-anisidine with chlorosulphonic acid and reacting the resulting acetyl-2-anisidine-4-sulphonchloride with beta-chloroethylamine in a 10% aqueous solution of acetone, the mixture being kept neutral to litmus by the addition of sodium carbonate, filtering off the acetyl 2-anisidine-4-sulphon-N-(beta-chloroethyl)amide which is formed and heating this with a 15% aqueous solution of hydrochloric acid at 80° C. The solution is then cooled and the 2-anisidine - 4 - sulphon-N-(beta-chloroethyl)amide hydrochloride which separates out is filtered off and dried.

The 2-amino-4-trifluoromethylbenzenesulphon-N-(beta-chloroethyl)amide used in the above examples may be obtained by reacting 2-nitro-4-trifluoromethylchlorobenzene with sodium disulphide, passing chlorine into an aqueous suspension of the 2:2'-dinitro-4:4'-di(trifluoromethyl)-diphenyldisulphide so obtained, reacting the 2-nitro-4-trifluoromethylbenzenesulphon chloride so obtained with beta-chloroethylamine hydrochloride in aqueous medium in the presence of Raney nickel catalyst, filtering off the 2 - nitro-4-trifluoromethylbenzenesulphon-N-(beta-chloroethyl)amide which is formed. This nitro compound is then reduced to the corresponding amino compound by hydrogenating an ethanol solution of the nitro compound in the presence of Raney nickel catalyst, filtering off the catalyst and evaporating off the ethanol from the filtrate when 2 - amino-4-trifluoromethylbenzenesulphon-N-(beta-chloroethyl)amide is obtained in the form of an oil.

The 2 - amino-5-nitrobenzenesulphon - N-(beta-chloroethyl)amide used in the above examples may be obtained as follows:

A solution of 25 parts of beta-chloroethylamine hydrochloride in 50 parts of water is added with stirring to a solution of 40 parts of 4-nitroacetanilide 2-sulphonylchloride (which is obtained by reacting 4-nitroacetanilide 2-sulphonic acid with a mixture of phosphorus oxychloride and phosphorus pentachloride) in a mixture of 160 parts of acetone and 40 parts of water, which has been cooled to a temperature of 10° C. 170 parts of a 2 N aqueous solution of sodium carbonate are then added during 1 hour and the mixture stirred for a further 20 hours, during which time the acetone evaporates off. The precipitated 2-acetylamino-5-nitro-benzenesulphon-N-(beta-chloroethyl)amide is then filtered off, washed with water and dried. A mixture of 20 parts of this compound, 38 parts of water, 50 parts of acetone and 27 parts of a 36% aqueous solution of hydrochloric acid is stirred at the boil under a reflux condenser for 8 hours. The solution is then cooled to 20° C. and the yellow crystalline solid filtered off, washed with water and dried. The product has a melting point of 125° C.

The 2 - naphthol-6-sulphon-N-(beta-chloroethyl)amide used in the above examples may be obtained as follows:

A mixture of 23 parts of 2-hydroxy-1-naphthoic acid 6-sulphon-N-(beta-chloroethyl)amide (which is obtained by reacting 2-hydroxy-1-naphthoic acid 6-sulphonchloride with beta-chloroethylamine in water in the presence of sodium carbonate), 54 parts of water, 38 parts of a 36% aqueous solution of hydrochloric acid and 80 parts of acetone is stirred at the boil under a reflux condenser for 12 hours. The solution is then cooled to 20° C. and the crystalline solid so obtained is filtered off, washed with water and dried. The product so obtained has a melting point of 137° C.

The 2 - naphthylamine-6-sulphon-N-(beta-chloroethyl)-amide used in the above examples may be obtained by reacting 2 - acetylaminonaphthalene-6-sulphonchloride with beta-chloroethylamine in water in the presence of sodium carbonate, filtering off the 2-acetylaminonaphthalene-6-sulphon-N-(beta-chloroethyl)amide which is precipitated and hydrolysing off the N-acetyl group by heating the solid so obtained with an aqueous solution of hydrochloric acid. On cooling the solution the product crystallises out and is filtered off and dried.

1 - naphthylamine-4-sulphon-N-($\beta$ - chloroethyl)amide may similarly be obtained from 1-acetylaminonaphthalene-4-sulphonchloride and $\beta$-chloroethylamine.

The 3-N:N-diethylaminobenzenesulphon-N-($\beta$-chloroethyl)amide used in the above examples may be obtained by heating a mixture of 126 parts of sodium diethyl metanilate and 583 parts of chlorosulphonic acid for 8 hours at 100° C., pouring the mixture onto ice, filtering off the 3-N:N-diethylaminobenzenesulphonchloride which is precipitated and reacting this with $\beta$-chloroethylamine in water in the presence of sodium carbonate. The precipitated solid is then filtered off, washed with water and dried. The product has a melting point of 62° C.

The 3 - acetoacetylaminobenzenesulphon-N-($\beta$-chloroethyl)amide used in the above examples may be obtained as follows:

A mixture of 12.6 parts of diketone, 23.5 parts of 3-aminobenzenesulphon-N-($\beta$-chloroethyl)amide and 150 parts of $\beta$-ethoxyethanol is stirred for 72 hours at 20° C., 500 parts of water are then added and the precipitated solid is filtered off, washed with water and dried. The product so obtatined has a melting point of 86° C.

The 3 - aminobenzenesulphon-N-($\gamma$-chloro-$\beta$-hydroxypropyl)-N-benzylamide and 3-aminobenzenesulphon-N-($\gamma$-chloro-$\beta$-hydroxypropyl-N-cyclohexylamide used in the above examples may be obtained by reaction of m-nitrobenzene sulphonchloride with benzylamine and cyclohexylamine respectively, followed by condensation of the products with epichlorohydrin and reduction of the nitro group.

The 3 - aminobenzenesulphon-N-($\gamma$-chloro-$\beta$-hydroxypropyl)-N-allylamide used in the above examples may be obtained by reaction of m-acetylaminobenzenesulphon chloride with allylamine, followed by condensation of the product with epichlorohydrin and hydrolysis of the acetyl group.

N - $\beta$ - hydroxyethyl-N-$\beta'$-aminocarbonyl ethyl-m-toluidine, used in the above examples may be obtained by the action of hydrogen peroxide on N-$\beta$-hydroxyethyl-N-$\beta$-cyanoethyl-m-toluidine in alkaline medium at a temperature of between 50° and 60° C.

N - ethyl - N - (3' - $\beta$ - chloroethylaminosulphonylbenzyl)aniline, used in the above examples may be prepared by heating a mixture of 157 parts of N-ethyl-N-(3'-sulphobenzyl)aniline (sodium salt) and 583 parts of chlorosulphonic acid for 3 hours at 60° C., pouring the mixture onto ice, filtering off the N-ethyl-N-(3'-chlorosulphonylbenzyl)aniline which is precipitated and reacting this with $\beta$-chloroethylamine in water in the presence of sodium carbonate. The precipitated solid is then filtered off, washed with water and dried. The product has a melting point of 71–72° C. 1-(3'-$\beta$-chloroethylaminosulphonylphenyl)-3-methyl-5-pyrazolone used in the above examples may be prepared by reaction of 3-hydrazinobenzenesulphon - N - ($\beta$ - chloroethyl)amide (prepared from m-aminobenzenesulphon-N-($\beta$-chloroethyl)amide via a zinc/acetic acid reduction of the diazosulphonate) with ethyl acetoacetate.

*Example 109*

A stirred solution of 2.91 parts of 2-amino-6-($\beta$-chloroethylsulphamyl)benzthiazole in 12 parts of 80% phosphoric acid is cooled to 5° C. and 0.76 part of sodium nitrite is added evenly during 1 hour. 8 parts of glacial acetic acid is added and the mixture stirred for 5 to 10 minutes until there is no nitrous acid present. A solution of 1.74 parts of 1-phenyl-3-methyl-5-pyrazolone dissolved in 4 parts of glacial acetic acid is added to the mixture with stirring at 5 to 10° C., followed by 11.3 parts of anhydrous sodium acetate. The mixture is stirred for 30 minutes then poured into 100 parts of cold water the precipitated dyestuff filtered off and washed with water until neutral. The dyestuff thus obtained dyed nylon in yellow shades.

2 - amino - 6 - ($\beta$ - chloroethylsulphamyl)benzthiazole may be obtained by the action of bromine in glacial acid on a solution of 4-aminobenzenesulphon-N-($\beta$-chloroethyl)amide and potassium thiocyanate in glacial acetic acid. The precipitate obtained is filtered off, boiled with water, the solution obtained screened and neutralised while hot with 4 N sodium acetate solution. The precipitated 2 - amino - 6 - ($\beta$ - chloroethylsulphamyl) benzthiazole is filtered off, washed with water and dried. The product has a melting point of 191–192° C.

*Example 110*

A solution of 6.9 parts of sodium nitrite in 50 parts of water is added to a solution of 26.5 parts of 2-anisidine-4-sulphon-N-($\beta$-chloroethyl)amide hydrochloride in a mixture of 600 parts of water and 15 parts of a 36% aqueous solution of hydrochloric acid, the temperature being held between 5° and 10° C. by external cooling. The solution so obtained is stirred for 10 minutes and then added to a solution of 13.7 parts of cresidine in a mixture of 200 parts of water and 12 parts of a 36% aqueous solution of hydrochloric acid at a temperature of between 5° and 10° C. The mixture is stirred for 2½ hours and a 30% aqueous solution of sodium acetate added until the mixture is no longer acid to Congo Red. The amino monoazo compound so obtained is then filtered off. The solid so obtained is then stirred with a mixture of 1000 parts of water and 25 parts of a 36% aqueous solution of hydrochloric acid, a solution of 6.9 parts of sodium nitrite in 50 parts of water is added the temperature of the mixture being held between 5° and 10° C. by external cooling, and the mixture is then stirred at this temperature for 17 hours. The solution so obtained is then added to a solution of 12.4 parts of m-methoxyphenol, 28 parts of sodium carbonate, 40 parts of sodium acetate crystals and 4 parts of sodium hydroxide in 450 parts of water, at a temperature of between 0° and 5° C. The mixture is stirred for 30 minutes and the precipitated disazo dyestuff filtered off, washed with water and dried. When the dyestuff is disperesed in aqueous medium it dyes polyamide textile materials in red shades possessing excellent fastness to washing.

*Example 111*

To a solution of 4.54 parts of 2-hydroxy-5-methyl-4'-aminoazobenzene in a mixture of 120 parts of acetone and 100 parts of water there are simultaneously added a solution of 5.7 parts of 3-(2'-chloroethyl)aminosulphonylbenzoylchloride in 16 parts of water and 30 parts of an N aqueous solution of sodium carbonate, the temperature of the mixture being maintained below 5° C. by external cooling. The mixture is then stirred for 20 hours, during which time the acetone evaporates off. The precipitated dyestuff is then filtered off, washed with water and dried. When dispersed in aqueous medium it dyes polyamide textile materials in yellow shades possessing excellent fastness to washing.

The 3 - (2' - chloroethyl)aminosulphonylbenzoylchloride used in the above example may be obtained as follows:

A mixture of 20 parts of 3-(2'-chloroethyl)aminosulphonyl benzoic acid (which is obtained by reacting benzoic acid 3-sulphonyl chloride with beta-chloroethylamine), 13 parts of thionyl chloride and 80 parts of toluene is stirred at the boil under a reflux condenser for 16 hours. The mixture is then distilled under reduced pressure until 50 parts of distillate are obtained. The residual liquid is then cooled and the solid which crystallises out is filtered off, washed with toluene and dried. The product so obtained has a melting point of 82° C.

*Example 112*

1 part of the dyestuff of Example 19 is dispersed in 20 parts of water and the dispersion so obtained is added to 4000 parts of water containing 4 parts of a condensate of ethylene oxide with a fatty alcohol. 100 parts of natural silk are placed in the dyebath so obtained and dyeing is carried out for 1 hour at 95° C. The natural silk is then removed from the dyebath, rinsed in cold water, and then immersed for 15 minutes in an aqueous solution containing 0.2% of a condensate of ethylene oxide with an alkyl phenol and 0.2% of sodium carbonate, which is heated to 60° C. The natural silk is then rinsed in water and dried. The natural silk is dyed a scarlet shade possessing excellent fastness to wet treatments.

*Example 113*

In place of the 1 part of the dyestuff of Example 19 used in Example 112 there is used 1 part of the dyestuff of Example 2 and in place of the 100 parts of natural silk there are used 100 parts of a modified polyacrylonitrile fibre. The fibre is dyed an orange shade possessing excellent fastness to wet treatments.

*Example 114*

100 parts of polyhexamethylene adipamide textile material are immersed in a dyebath comprising 4000 parts of water and 5 parts of 2-amino-5-nitrobenzenesulphon-N-(β-chloroethyl)amide and the dyebath is then heated at 85° C. for 1 hour. The textile material is then immersed for 30 minutes in a mixture of 4000 parts of water, 12 parts of sodium nitrite and 36 parts of a 36% aqueous solution of hydrochloric acid at 15° C. The textile material is then removed from the mixture and immersed for 30 minutes in a solution of 4 parts of 3-diethylaminoacetanilide hydrochloride in 4000 parts of water at 60° C. The textile material is then rinsed in water and treated for 30 minutes in a 0.2% aqueous solution of soap at 95° C. The textile material is coloured a violet shade possessing excellent fastness to wet treatments.

*Example 115*

In place of the 5 parts of 2-amino-5-nitrobenzenesulphon-N-(β-chloroethyl)amide used in Example 114 there are used 5 parts of 4-aminobenzenesulphon-N-(β-chloroethyl)amide whereby the polyhexamethylene adipamide textile material is dyed an orange shade possessing excellent fastness to wet treatments.

The 100 parts of polyamide textile material used in the above example may be replaced by 100 parts of cellulose acetate rayon fabric whereby the cellulose acetate rayon fabric is dyed an orange shade possessing excellent fastness to wet treatments.

What we claim is:

Dyestuffs having the formula:

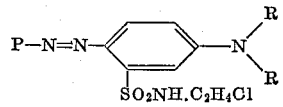

wherein:
R is a lower alkyl radical:
P represents a radical selected from the class consisting of thiazole and benzene radicals; and,
any substituents on the thiazole radical are selected from the class consisting of methyl and nitro substituents, any substituents on the benzene radical are selected from the class consisting of chlorine, nitro, sulphonamide, lower alkyl sulphonyl, cyano, trifluoromethyl, β-hydroxyethylsulphonyl, and sulphon - N - (β - chloroethyl)-amide substituents.

No references cited.